United States Patent [19]

Carpenter et al.

[11] Patent Number: 5,050,956
[45] Date of Patent: Sep. 24, 1991

[54] OPTICAL FIBER ATTENUATOR AND CONNECTING ELEMENT

[75] Inventors: P. Kevin Carpenter, Wheaton, Md.; Michael J. James, Stirling, Va.

[73] Assignee: Hunter Associates Laboratory Inc., Va.

[21] Appl. No.: 585,504

[22] Filed: Sep. 20, 1990

[51] Int. Cl.⁵ .............................................. G02B 6/38
[52] U.S. Cl. ...................................... 385/140; 385/60
[58] Field of Search .............. 350/96.15, 96.21, 96.20, 350/96.22, 320

[56] References Cited

U.S. PATENT DOCUMENTS

| | | | |
|---|---|---|---|
| 4,021,099 | 5/1977 | Kawasaki et al. | 350/96.18 X |
| 4,145,110 | 3/1979 | Szentesi | 350/96.15 |
| 4,281,925 | 8/1981 | Forrest et al. | 356/73.1 |
| 4,307,937 | 12/1981 | Gordon | 350/96.29 |
| 4,423,922 | 1/1984 | Porter | 350/96.15 |
| 4,516,827 | 5/1985 | Lance et al. | 350/96.15 |
| 4,645,294 | 2/1987 | Oguey et al. | 350/96.15 |
| 4,666,243 | 5/1987 | Rogstadius et al. | 350/96.21 |
| 4,668,044 | 5/1987 | D'Auria et al. | 350/96.15 |
| 4,697,869 | 10/1987 | So et al. | 350/96.15 |
| 4,714,317 | 12/1987 | Szentesi | 350/96.21 |
| 4,717,234 | 1/1988 | Barlow et al. | 350/96.21 |
| 4,718,746 | 1/1988 | Chrepta | 350/96.21 |
| 4,721,351 | 1/1988 | Goepfert et al. | 350/96.15 |
| 4,787,700 | 11/1988 | Yin | 350/96.21 |
| 4,878,730 | 11/1989 | Wall | 350/96.21 |
| 4,892,380 | 1/1990 | Mori | 360/96.21 |
| 4,893,889 | 1/1990 | Iwakiri et al. | 350/96.15 |
| 4,900,124 | 2/1990 | Lampert | 350/96.21 |
| 4,904,044 | 2/1990 | Tamulevich | 350/96.18 |
| 4,986,627 | 1/1991 | Boscher et al. | 350/96.21 |

FOREIGN PATENT DOCUMENTS

| | | | |
|---|---|---|---|
| 55-130503 | 10/1980 | Japan | 350/96.21 X |
| 56-85702 | 7/1981 | Japan | 350/96.21 X |
| 59-94702 | 5/1984 | Japan | 350/96.21 X |
| 59-192204 | 10/1984 | Japan | 350/96.21 X |
| 60-174969 | 9/1985 | Japan | 350/96.14 X |
| 60-175008 | 9/1985 | Japan | 350/96.21 X |
| 63-273812 | 11/1988 | Japan | 350/96.21 X |
| 2166885 | 5/1986 | United Kingdom | 350/96.21 X |

OTHER PUBLICATIONS

U.S. Statutory Invention Registration No. H491, Jul. 5, 1988, Pitruzzello et al.

Primary Examiner—Brian Healy
Attorney, Agent, or Firm—Nixon & Vanderhye

[57] ABSTRACT

The attenuator includes an externally threaded sleeve for receiving standard ferrules within its bore at opposite ends, an internally threaded adjuster for threaded engagement about the sleeve and a ferrule locking nut threadedly engageable about the adjuster for clamping a ferrule at one end of the sleeve between the adjuster and ferrule locking nut. By relatively threading the sleeve and adjuster, the ferrule may be displaced relative to the sleeve whereby the end face of the optical fiber carried thereby is adjustably spaced from the end face of an optical fiber carried by a ferrule fixed on the sleeve at the opposite end thereof.

17 Claims, 2 Drawing Sheets

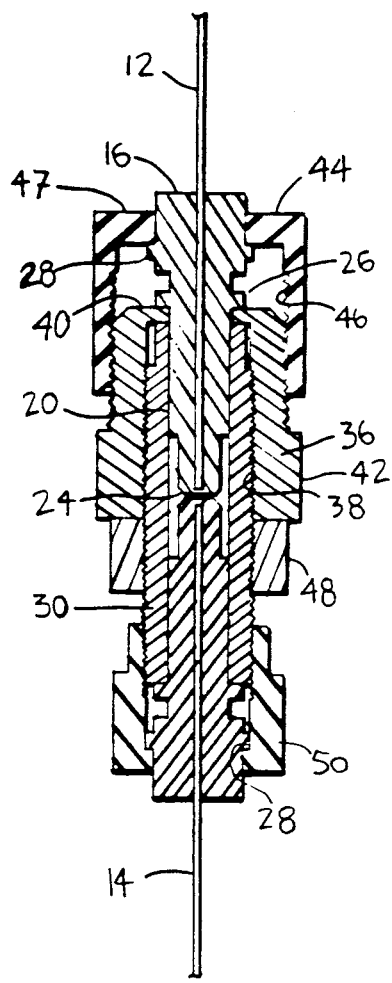
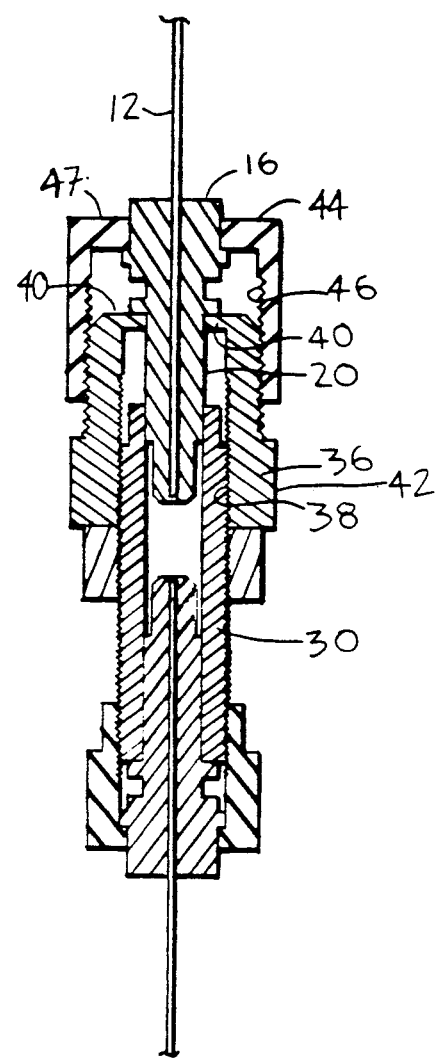
FIG. 3A.          FIG. 3B
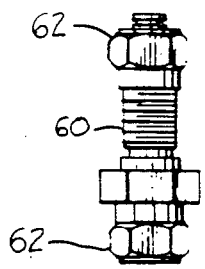
FIG. 4
(PRIOR ART)

OPTICAL FIBER ATTENUATOR AND CONNECTING ELEMENT

BACKGROUND AND SUMMARY OF THE INVENTION

The present invention relates to apparatus for attenuating light passing from one optical fiber to another by varying the distance from one optical fiber end face to the end face of the opposed optical fiber and particularly relates to an optical fiber attenuator of this type which is compact in construction and readily and easily utilized. The present invention also relates to a connecting element for securing an optical fiber connecting ferrule in an optical fiber assembly.

In many fiber optics systems, optical fiber attenuators are used to reduce energy levels in the transmission of light from a transmitting station to a receiving station. Also, for evaluating fiber optics systems, optical fiber attenuators are used to simulate transmission losses over long distances. A fiber optic attenuator is a device for adjustably spacing the end faces of a pair of optical fibers. By spacing these end faces a greater extent relative to one another, the attenuation of the light transmitted from one optical fiber to the other is increased. Conversely, the degree of attenuation of light transmitted between two opposed end faces is decreased as the spacing therebetween is decreased.

One criteria for an effective fiber optic attenuator is that it must be compatible with standard (e.g., "SMA" type) fiber optic connectors. Standard connectors typically comprise ferrules, including an elongated shaft through which the optical fiber passes, the optical fiber terminating adjacent the end face of the shaft. A pair of axially spaced flanges are disposed adjacent the opposite end of the ferrule for use with conventional elements for connecting the ferrules one to the other. Thus, any commercially successful fiber optic attenuator must be constructed in a manner to enable connection with these standard connectors.

There are also many fiber optic applications which require the use of a very small and compact fiber optic attenuator. In one such prior optical fiber attenuator, the standard fiber optic connector is disposed in a connector interface adaptor by threading a nut over the connector onto the adaptor. The adaptor is then threaded into a large-diameter, externally-threaded sleeve bearing an external locking nut. That sub-assembly is threadedly received within an outer housing, the opposite end of which receives a connector. By threading the inner and outer housings relative to one another, the spacing between the end faces of the optical fibers secured respectively to the inner and outer housings may be adjusted whereby the attenuation is likewise adjusted. A fiber optic attenuator of this type is manufactured and sold by Fotec, Inc., Boston, Mass., under the tradename "The Fotec A430 Fiber Optic Attenuator." While this attenuator serves its purpose, it is bulky, for example, has a length at least five or six times the length of each of the ferrules of the standard connector and a diameter well in excess of five times the diameter of the shaft of the ferrule.

It has also been recognized by those skilled in this art that the shafts of the standard ferrules must be fully inserted into a bore to provide coaxial orientation. Thus, known attenuators maintain the entire length of the shaft of the standard ferrule in the bore of a corresponding part and displace the parts axially relative to one another in order to maintain that coaxial relation. However, it has been discovered that the degree to which the shaft can be inserted into the bore can be varied to adjust the attenuation without substantially affecting the linearity of the attenuation introduced by the coupler. That is, the shaft of the standard ferrule may be withdrawn from a corresponding bore of an attenuator to a limited extent and to the desired degree of attenuation so that limited misalignment in the coaxial relation of the ferrule shafts can be tolerated.

In the prior art, the degree of concentricity or coaxial alignment which needs to be maintained between the opposed ferrules, particularly at small gaps, is degraded because such concentricity is transferred through several sets of threads. That is, there is side play during the threading action which axially misaligns the ferrules which, at small gaps, may inhibit or even eliminate transmission of light from one optical fiber to the other. In the present invention, both ferrules are maintained in a common bore which maintains the coaxial alignment of the ferrules, particularly at smaller gaps.

Additionally, in many optical fiber applications it is customary to connect long lengths of optical fiber to connectors using lock nuts. Typically, the end of the optical fiber is passed through a bore in a standard connector ferrule to project from its opposite end. The fiber is adhesively secured in the bore and the projecting end removed and polished. If this is done without first threading the lock nut onto the optical fiber, i.e., prior to passing the optical fiber into the bore of the ferrule, great difficulty obtains in applying the lock nut to the ferrule and associated connecting part and about the optical fiber. To alleviate that problem, applicants use optical fiber connectors, e.g., lock nuts, which have an axially extending slit along one side thereof for passing the optical fiber through the slit into the bore of the connector. Consequently, even after connecting the optical fiber to the ferrule, for example, the connector or lock nut can be disposed about the optical fiber by passing the fiber through the slit into the bore of the connector.

Accordingly, in accordance with the present invention, there is provided a fiber optic attenuator which eliminates or minimizes the foregoing and other problems associated with prior fiber optic attenuators and provides a compact, relatively inexpensive and readily and easily used fiber optic attenuator having various advantages in construction, mode of operation and result. Particularly, the present invention provides an attenuator assembly comprised of a sleeve having a throughbore for receiving at opposite ends the standard ferrules of optical fiber connectors. Each ferrule, of course, carries the optical fiber and, when the ferrule shafts are disposed in the bores, the end faces of the optical fibers lie in spaced opposition one to the other. The sleeve is externally threaded and receives an internally threaded adjuster about one end. The adjuster has a radially inwardly directed flange for disposition between the end face of the sleeve and a flange on the connector. The adjuster itself is externally threaded to receive a ferrule lock nut thereabout. The ferrule lock nut has a radially inwardly directed flange for engaging the standard connector whereby the connector is clamped between the ferrule lock nut and the adjuster. The other ferrule is retained in fixed position in the opposite end of the sleeve by a ferrule lock nut. An additional lock nut is threaded about the sleeve to lock the adjuster in adjustable axial position along the sleeve.

With the foregoing construction, the sleeve carrying the fixed ferrule may be screwed in or out relative to the adjuster and the ferrule lock nut carried by the adjuster whereby the spacing between the end faces of the ferrules and hence between the opposed end faces of the optical fibers can be varied. Jamming the lock nut against the adjuster then locks the ferrule carried by the adjuster and ferrule lock nut in its adjusted position. Hence, by this threading action, a predetermined attenuation is afforded.

It will be appreciated that the shaft of the standard connector ferrule carried by the adjuster and ferrule lock nut is moved in and out of the bore of the sleeve. While general axial alignment is maintained between the fiber faces, it has been found that as the desired degree of attenuation increases as the gap between the end faces of the optical fibers increases, the coaxial orientation of the two fiber end faces becomes less critical so that it is tolerable to introduce a degree of misalignment without substantially affecting the linearity of the attenuation introduced by the coupler.

With the foregoing described construction, the attenuator may be constructed in a relatively compact manner. For example, the length of the attenuator hereof may be no greater than the combined length of two standard ferrules at minimum attenuation and that, plus the length of a portion of one ferrule shaft at maximum attenuation. Additionally, the diameter of the attenuator hereof has a cross-section no greater than about five times the diameter of the shaft of the ferrule. In this manner, a relatively compact attenuator is provided.

In accordance with a further aspect of the present invention, the lock nuts are provided along one side with an axially extending slit. The slit is sized to permit passage of the optical fiber through the slit into the bore of the lock nut. In this manner, the lock nut may be applied to the optical fiber and, hence, the part to which it is connected, after the fiber has been secured to the ferrule.

In a preferred embodiment according to the present invention, there is provided apparatus for adjusting the attenuation of light passing between a pair of optical fibers disposed in spaced end-to-end relation one to the other, comprising a pair of elongated, generally cylindrical, ferrules mounting respective optical fibers generally axially therealong with the fibers terminating in end faces substantially adjacent the respective ends of the ferrules, a sleeve having a throughbore for receiving the ferrules through its opposite ends with the ferrule ends in opposition to one another and the fiber end faces in spaced opposing relation to one another, at least a portion of the sleeve being externally threaded and an internally threaded adjuster for threaded engagement about one end of the sleeve, the adjuster having an opening at one end for receiving one of the ferrules and an externally threaded portion, means for retaining the other of the ferrules in the other end of the sleeve and an internally threaded nut for threaded engagement with the externally threaded portion of the adjuster and having an opening at one end for receiving the one ferrule. Means are cooperable between the one ferrule and at least one of the adjuster and the nut for retaining the one ferrule in the sleeve and responsive to threading action between the adjuster and the sleeve for axially displacing the one ferrule relative to the other ferrule whereby the ends of the ferrules and the end faces of the optical fibers carried thereby are adjustably spaced one from the other.

In a further preferred embodiment according to the present invention, there is provided apparatus for adjusting the attenuation of light passing between a pair of optical fibers carried by a pair of elongated, generally cylindrical, ferrules disposed in spaced end-to-end relation one to the other, comprising a sleeve having a throughbore for receiving the ferrules through its opposite ends with the ferrule ends in opposition to one another and the fiber end faces in spaced opposing relation to one another, at least a portion of the sleeve being externally threaded, an internally threaded adjuster for threaded engagement about one end of the sleeve, the adjuster having an opening at one end for receiving one of the ferrules and an externally threaded portion, means for retaining the other of the ferrules in the other end of the sleeve and an internally threaded nut for threaded engagement with the externally threaded portion of the adjuster and having an opening at one end for receiving the one ferrule, the internally threaded nut having a radially inwardly directed flange defining the opening therein for receiving the one ferrule. Means are provided carried by at least one of the adjuster and the nut and cooperable with the one ferrule for retaining the one ferrule in the sleeve and responsive to threading action between the adjuster and the sleeve for axially displacing the one ferrule relative to the other ferrule whereby the ends of the ferrules and the end faces of the optical fibers carried thereby are adjustably spaced one from the other.

In a further preferred embodiment according to the present invention, there is provided an optical fiber coupler/attenuator of the type for optically coupling first and second elongated optical fiber connector portions together, the coupler/attenuator including a unitary, substantially hollow tubular member having first and second ends adapted for axially receiving the first and second optical fiber connector portions, respectively, therein, the hollow tubular member maintaining the first and second optical fiber connectors substantially coaxial with one another and means coupled to the hollow tubular member first end for permitting manual adjustment, over a range, of the degree of insertion of the first fiber connector portion into the hollow tubular member and for locking the position of the first fiber connector portion with respect to the tubular member so as to maintain the adjusted degree of insertion.

In a further preferred embodiment according to the present invention, there is provided a method of adjusting the optical attenuation between two elongated optical fiber connector cylindrical ferrule portions optically coupled together via a substantially hollow tubular member, the hollow tubular member insertably receiving the ferrule portions therein and maintaining the two optical fiber connector ferrule portions substantially coaxial with one another, the method comprising adjusting the positional relationship of at least one of the ferrule portions with respect to the hollow tubular member so as to define a relative position whereat the one ferrule portion is less than fully inserted into the hollow tubular member and, subsequent to said adjusting step, locking the one ferrule portion in the less than fully inserted relative position.

In a further preferred embodiment according to the present invention, there is provided apparatus for securing an optical fiber connector in a connecting assembly comprising a sleeve for receiving the optical fiber connector and having a threaded portion, a connecting element for locking the optical fiber connector in the sleeve and defined by side walls having a threaded portion for threadedly engaging the threaded portion of the sleeve and an axial bore for receiving the optical fiber and the connecting element having a slot through the side walls extending axially and sized to enable the optical fiber to pass through the slot into the bore of the connecting element.

Accordingly, it is a primary object of the present invention to provide a novel and improved fiber optic attenuator which is compact in construction, inexpensive to fabricate, and provides a very fine attenuation adjustment as well as a method for adjusting the optical attenuation of coupled optical fibers. A further object hereof is to provide a connecting element for locking the optical fiber ferrule to another connecting part in a manner enabling application of the connecting element after the optical fiber is secured to the ferrule.

These and further objects and advantages of the present invention will become more apparent upon reference to the following specification, appended claims and drawings.

BRIEF DESCRIPTION OF THE DRAWING FIGURES

FIGS. 3A and 3B are enlarged longitudinal cross-sectional views of the attenuator hereof illustrating the minimum and maximum attenuation by the adjustment of the coupler; and FIG. 4 is a side elevational view of a conventional "SMA" type fiber optic coupler of the prior art.

DETAILED DESCRIPTION OF THE DRAWING FIGURES

Reference will now be made in detail to a present preferred embodiment of the invention, an example of which is illustrated in the accompanying drawings.

Figure 2:
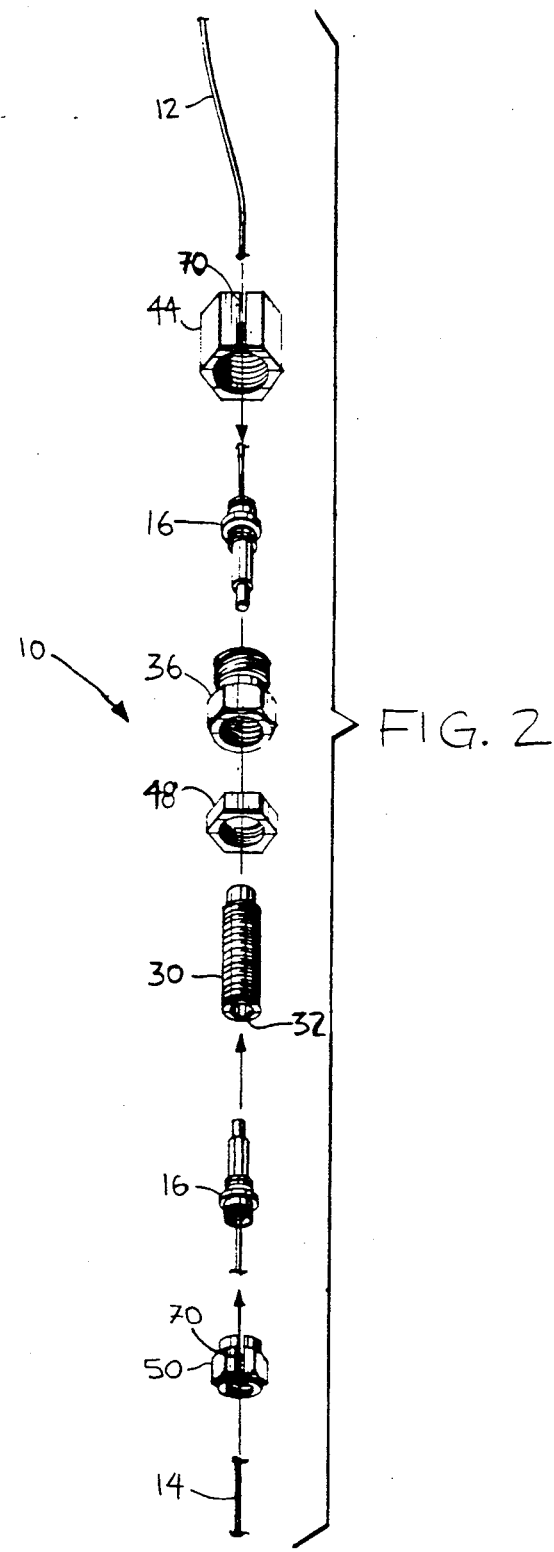
FIG. 2 is an exploded perspective view of an attenuator constructed in accordance with the present invention.

Referring now to the drawing figures, particularly to FIGS. 2 and 3, there is illustrated a fiber optic attenuator constructed in accordance with the present invention, and generally designated 10. Attenuator 10 provides a coupling between a pair of optical fibers 12 and 14, each terminating at their proximal ends in a standard connector or ferrule 16, for example, the ferrule identified as Part No. 906-122-5004, manufactured by Amphenol Products, Lisle, Ill. As best seen in FIGS. 3A and 3B, each standard ferrule 16 includes an elongated shaft 20, terminating at an end 24 substantially co-terminus with the end face of the optical fiber 12 or 14. Thus, the optical fibers 12 and 14 extend through the ferrules 16. Each ferrule 16 includes a radially outwardly directed flange 26 spaced axially from a corresponding radially outwardly directed flange 28, these flanges 26 and 28 on the standard ferrule 16 being used in a manner set forth hereinafter.

In accordance with the present invention, the assembly includes an externally threaded sleeve 30 having a throughbore 32. From a review of FIGS. 3A and 3B, it will be appreciated that the shafts 20 of ferrules 16 are received in the smooth bore 32 of sleeve 30. Attenuator assembly 10 also includes an adjuster 36. Adjuster 36 has an internally threaded bore 38 for threaded engagement with the external threads of sleeve 30 and, at one end, has a radially inwardly directed flange 40 for receiving the shaft 20 of ferrule 16. The end of the adjuster 36 opposite its flanged end 40 has a series of flats 42 formed thereabout for receiving a wrench.

Assembly 10 also includes a connecting element, i.e., a ferrule lock nut 44, which is internally threaded at 46 for threaded engagement with the external threads of adjuster 36. Ferrule lock nut 44 has a radially inwardly directed flange 47 for receiving the head of ferrule 16. On sleeve 30, there is also provided a lock nut 48 for locking adjuster 36 in a selected axial position along sleeve 30, as will be described.

To retain ferrule 16 in the opposite end of the assembly, i.e., the lower end, as illustrated in FIGS. 3A and 3B, there is provided a ferrule lock nut 50. Nut 50 is internally threaded for threaded engagement along the external threads of sleeve 30 and has a flange for engaging the outermost flange 28 of ferrule 16 to clamp it between the sleeve end and the nut flange whereby ferrule 16 is locked in the assembly. In FIG. 3A, the attenuator assembly is illustrated with the ferrules 16 in close, end-to-end opposition to one another, with the end faces of the optical fibers spaced a minimum distance one from the other and, hence, for minimum attenuation. To adjust the attenuation, for example, to increase the attenuation from that illustrated in FIG. 3A, the sleeve 30 may be unthreaded from the adjuster. By axially displacing the sleeve relative to adjuster 36, the lower ferrule 16 carried by the sleeve is spaced from the upper ferrule 16 clamped to the ferrule lock nut 44 and adjuster 36. Consequently, the effective length of shaft 20 of upper ferrule 16 in the bore of sleeve 30 is shortened and the gap between the end faces of the optical fibers opens and increases. It will be appreciated that the effective length of shaft 20 in the sleeve substantially decreases with increased attenuation. It is thus recognized that, as the desired degree of attenuation increases, the coaxial orientation of the optical fibers 14 and 12 become less critical. Hence, it is tolerable to introduce a degree of axial misalignment without substantially affecting the linearity of the attenuation introduced by the coupler.

The standard connectors, for example, the Amphenol connectors, for optical fibers have a shaft length of 9.812 millimeters and the shaft has a width of 3.05 millimeters. The present attenuator provides a compact assembly for use with these standard connectors of a size much reduced from those attenuators currently available. For example, the attenuator assembly of the present invention in a minimum attenuation position thereof has a length of 31 millimeters and in a maximum attenuation position, a length of no greater than about 40 millimeters. It will be appreciated that the overall length of the assembly is limited to the combined length of the two ferrules at minimum attenuation and that length, plus a portion of the axial length of shaft 20 at maximum attenuation. Also, from a review of FIGS. 3A and 3B, it will be appreciated that the diameter of the attenuator assembly is no greater than about five times the diameter of the shaft.

Figure 1:
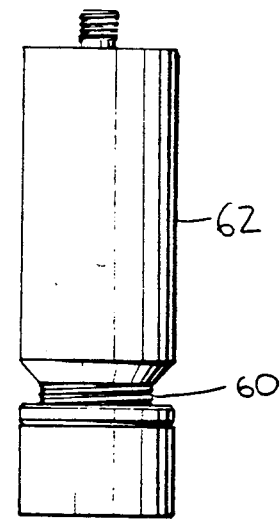
FIG. 1 is a side elevational view of the prior art attenuator described above.

In sharp contrast, there is illustrated in FIG. 1, the fiber optic attenuator of the prior art discussed above, which has length and diametrical dimensions far in excess of those stated above with respect to the attenuator assembly of the present invention. That attenuator, moreover, includes an interface adapter, not shown, threaded into the end of externally threaded sleeve 60 and which adapter, in conjunction with a nut, fixes one of the standard connectors in sleeve 60. The other connector is fixed to an outer housing screw threaded on sleeve 60. Relative threading action between the sleeve and housing causes the optical fiber ends to lie in adjusted spaced positions relative to one another. This attenuator, however, is very large in comparison to the attenuator hereof.

In FIG. 4, there is illustrated a connector assembly for standard ferrules 16 but which assembly does not have any axial adjustment whereby the attenuation can be varied as desired. In this prior art connector, there is provided a sleeve 60, which is externally threaded, a pair of locking nuts 62 at opposite ends of the sleeve for connecting the ferrules to the sleeve in a manner not shown. The shaft of the ferrules is received within the internal bore of sleeve 60 and the ends of the optical fibers are spaced in opposition one to the other. However, no adjustment of those optical fiber ends is provided in this type of connector and it is merely disclosed herein for purposes of disclosing a prior art connecting device.

In accordance with a further aspect of the present invention, the connecting elements, i.e., ferrule lock nuts 44 and 50, are provided with axially extending slots 70 along one side thereof. The slots 70 are sized to receive and pass an optical fiber, such as the optical fibers 12 and 14, into the interior or central bore of the nuts 44 and 50. The screw threads along the interior wall of the nuts 44 and 50 are, of course, interrupted but the threading action is not interrupted. With the slit 70 extending between the opposite ends of each nut, they may be applied to the optical fibers 12 and 14 by passing the optical fibers through the slits such that the optical fibers may lie coaxially within the bore of the nuts. This facilitates the application of the nuts once the ends of the optical fibers have been secured in the ferrules and does not require that the nuts be applied to the optical fiber prior to securement of the optical fiber ends to the ferrules.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for adjusting the attenuation of light passing between a pair of optical fibers disposed in spaced end-to-end relation one to the other, comprising:
a pair of elongated, generally cylindrical, ferrules mounting respective optical fibers generally axially therealong with the fibers terminating in end faces substantially adjacent the respective ends of the ferrules;
a sleeve having a throughbore for receiving the ferrules through its opposite ends with the ferrule ends in opposition to one another and the fiber end faces in spaced opposing relation to one another, at least a portion of said sleeve being externally threaded;
an internally threaded adjuster for threaded engagement about one end of said sleeve, said adjuster having an opening at one end for receiving one of said ferrules and an externally threaded portion;
means for retaining the other of said ferrules in the other end of said sleeve;
an internally threaded nut for threaded engagement with the externally threaded portion of said adjuster and having an opening at one end for receiving said one ferrule; and
means cooperable between said one ferrule and at least one of said adjuster and said nut for retaining said one ferrule in said sleeve and responsive to threading action between said adjuster and said sleeve for axially displacing said one ferrule relative to the other ferrule whereby the ends of the ferrules and the end faces of the optical fibers carried thereby are adjustably spaced one from the other.

2. Adjusting apparatus according to claim 1 including a locking nut externally threaded about said sleeve for locking said adjuster in axially adjusted position along said sleeve.

3. Adjusting apparatus according to claim 1 wherein said retaining means includes an internally threaded ferrule lock nut threadably engageable with the external threads on said sleeve and engageable with said other ferrule.

4. Adjusting apparatus according to claim 3 wherein said ferrules are identical in configuration to one another.

5. Adjusting apparatus according to claim 1 wherein said internally threaded nut has a radially inwardly directed flange defining the opening therein for receiving the one ferrule, said one ferrule having a pair of annular flanges spaced axially one from the other, with said flanges engaging said adjuster and said internally threaded nut, respectively, to lock said one ferrule to said nut and said adjuster for movement therewith upon threading action between said adjuster and said sleeve.

6. Adjusting apparatus according to claim 1 wherein each ferrule carries a flange and a projecting shaft carrying the optical fiber and its end face, said flange abutting said sleeve determining the maximum extent to which the ferrule is receivable in said one sleeve end for optimal coaxial alignment of the optical fibers, the threading action between said adjuster and said sleeve displacing the one ferrule from said sleeve and reducing the extent to which said shaft lies in said sleeve whereby, as the space between the end faces of the optical fibers and, hence, degree of attenuation increases, a degree of axial misalignment without substantially affecting the linearity of the attenuation is permitted.

7. Adjusting apparatus according to claim 1 wherein said ferrule has a shaft receivable in said sleeve, said shaft having a predetermined diameter, the largest cross-section of said adjusting apparatus being no greater than about five times the diameter of said shaft.

8. Adjusting apparatus according to claim 1 wherein each ferrule has a shaft of predetermined length receivable in said sleeve, the overall length of said adjusting apparatus at maximum spacing between said optical fiber end faces and at maximum attenuation being no greater than the combined axial length of said pair of ferrules and the length of the shaft of one ferrule.

9. Adjusting apparatus according to claim 1 wherein said ferrule has a shaft receivable in said sleeve, said shaft having a predetermined diameter, the largest cross-sectional of said adjusting apparatus being no greater than about five times the diameter of said shaft, each ferrule having a shaft of predetermined length receivable in said sleeve, the overall length of said adjusting apparatus at maximum spacing between said optical fiber end faces and at maximum attenuation being no greater than the combined axial length of said pair of ferrules and the length of the shaft of one of said pair of ferrules.

10. Apparatus for adjusting the attenuation of light passing between a pair of optical fibers carried by a pair of elongated, generally cylindrical, ferrules disposed in spaced end-to-end relation one to the other, comprising:

a sleeve having a throughbore for receiving the ferrules through its opposite ends with the ferrule ends in opposition to one another and the fiber end faces in spaced opposing relation to one another, at least a portion of said sleeve being externally threaded;

an internally threaded adjuster for threaded engagement about one end of said sleeve, said adjuster having an opening at one end for receiving one of the ferrules and an externally threaded portion;

means for retaining the other of the ferrules in the other end of said sleeve;

an internally threaded nut for threaded engagement with the externally threaded portion of said adjuster and having an opening at one end for receiving the one ferrule, said internally threaded nut having a radially inwardly directed flange defining the opening therein for receiving the one ferrule; and means carried by at least one of said adjuster and said nut and cooperable with the one ferrule for retaining the one ferrule in said sleeve and responsive to threading action between said adjuster and said sleeve for axially displacing the one ferrule relative to the other ferrule whereby the ends of the ferrules and the end faces of the optical fibers carried thereby are adjustably spaced one from the other.

11. Adjusting apparatus according to claim 10 wherein said internally threaded nut includes an elongated slot along one side thereof for receiving the optical fiber within the nut.

12. Adjusting apparatus according to claim 10 including a locking nut externally threaded about said sleeve for locking said adjuster in axially adjusted position along said sleeve.

13. Adjusting apparatus according to claim 10 wherein the first mentioned retaining means includes an internally threaded ferrule lock nut threadably engageable with the external threads on said sleeve and engageable with the other ferrule.

14. Adjusting apparatus according to claim 13 wherein said lock nut includes an elongated slot along one side thereof for receiving the optical fiber within the lock nut.

15. Apparatus for securing an optical fiber connector in a connecting assembly comprising:

a sleeve for receiving the optical fiber connector and having a threaded portion;

a connecting element for locking the optical fiber connector in said sleeve and defined by side walls having a threaded portion for threadedly engaging the threaded portion of said sleeve and an axial bore for receiving the optical fiber; and said connecting element having a slot through said side walls extending axially and sized to enable the optical fiber to pass through the slot into the bore of said connecting element.

16. Apparatus according to claim 15 wherein said threaded portions of said connecting element and said sleeve comprise internal and external threads, respectively, thereabout.

17. Apparatus according to claim 16 wherein said connecting element has an annular portion and a radially inwardly directed flange at one end, said slot extending through said radially inwardly directed flange.

* * * * *